(12) United States Patent
Ota et al.

(10) Patent No.: US 7,595,285 B2
(45) Date of Patent: Sep. 29, 2009

(54) THERMOPLASTIC RESIN COMPOSITION INCLUDING A FLUORORESIN, RESINOUS MATERIAL INCLUDING SAME COMPOSITION, AND SLIDING MEMBERS USING SAME MATERIAL

(75) Inventors: Tomohito Ota, Yokohama (JP); Tomihito Hashimoto, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 736 days.

(21) Appl. No.: 10/685,782

(22) Filed: Oct. 16, 2003

(65) Prior Publication Data
US 2004/0082701 A1   Apr. 29, 2004

(30) Foreign Application Priority Data
Oct. 17, 2002   (JP)   ............................. 2002-303000

(51) Int. Cl.
F16C 33/20   (2006.01)
C08L 53/00   (2006.01)
C08F 8/30    (2006.01)
(52) U.S. Cl. .................. 508/100; 524/474; 525/178
(58) Field of Classification Search ............... 508/100; 524/462, 474; 525/178
See application file for complete search history.

(56) References Cited

U.S. PATENT DOCUMENTS 5,985,949 A * 11/1999 Seguchi et al. ............... 522/5
6,465,575 B1 * 10/2002 Kusano et al. ............... 525/199
6,552,099 B2 * 4/2003 Yamamoto et al. .......... 522/156
6,884,827 B2 * 4/2005 Ota et al. .................... 522/156

FOREIGN PATENT DOCUMENTS

| JP | 63179965 A | * | 7/1988 |
| JP | 2000-186162 A | | 7/2000 |
| JP | 2001-261966 A | | 9/2001 |
| JP | 2002-053761 A | | 2/2002 |
| JP | 2002-146202 A | | 5/2002 |
| JP | 2002-265630 A | | 9/2002 |
| JP | 2002265630 A | * | 9/2002 |
| JP | 2003049950 A | * | 2/2003 |

OTHER PUBLICATIONS

JPO Abstract for JP 2001-254839 and JP 2003049950.*
JPO Machine Translation for JP 2000-186162 and JP 2003049950.*

(Continued)

*Primary Examiner*—Glenn Caldarola
*Assistant Examiner*—Jim Goloboy
(74) *Attorney, Agent, or Firm*—Foley & Lardner LLP

(57) ABSTRACT

A sliding member formed of a resinous material is in sliding contact with a steel member in an automotive internal combustion engine. The resinous material includes a thermoplastic resin composition which includes a fluororesin in an amount ranging from 5 to 40 parts by weight, and a thermoplastic resin other than the fluororesin, in an amount ranging from 95 to 60 parts by weight. The fluororesin contains crosslink formed between at least a part of carbon atoms forming part of a molecule chain of the fluororesin and at least a part of carbon atoms forming part another molecular chain of the fluororesin, and active end group formed at least a part of the molecule chain of the fluororesin.

9 Claims, 3 Drawing Sheets

OTHER PUBLICATIONS

DERWENT Abstract for JP 63179965.*
International Search Report for PCT/JP2004/014700.*
Translation for JP 63-179965.*
Wicks, Coatings, in Kirk-Othmer Encyclopedia of Chemical Technology, vol. 7, John Wiley & Sons, 2002, p. 90.*
Japanese Industrial Standard, "Geometrical Product Specifications (GPS)—Surface Texture: Profile Method—Terms, Definitions and Surface Texture Parameters", JIS B 0601, 2001, pp. 1-34 (with English translation).
Japanese Industrial Standard, "Carbon Steels for Machine Structure Use", JIS G 4051, 1979, pp. 1-10.
Japanese Industrial Standard, "Rockwell Hardness Test—Test Method", JIS Z 2245, 1998, pp. 1-10.

* cited by examiner

THERMOPLASTIC RESIN COMPOSITION INCLUDING A FLUORORESIN, RESINOUS MATERIAL INCLUDING SAME COMPOSITION, AND SLIDING MEMBERS USING SAME MATERIAL

BACKGROUND OF THE INVENTION

This invention relates to improvements in a thermoplastic resin composition and a resinous material including the thermoplastic resin composition in order to obtain both a low frictional resistance and a high wear resistance for a sliding member such as a shoe of a chain guide or a chain tensioner in a chain system of an internal combustion engine.

In recent years, application of thermoplastic resin has advanced to sliding members such as bearings, rollers and gears from the viewpoints of lowering noise generated with sliding movement, weight-lightening of the sliding members and providing a non-lubrication for a sliding section. Additionally, environmental conditions (such as bearing pressure and temperature) under which the sliding members formed of resinous materials are used have become further severe owing to the fact that the sliding members or parts have been required, for example, to become further small-sized. Particularly, the resinous material of gears, pulleys, shoes of chain guides used for an automotive internal combustion engine are required to have a heat resistance at temperatures of 140° C. or higher and a high oil resistance. Accordingly, polyamide resin is selected as the resinous material because it is excellent in heat resistance, oil resistance, mechanical strength and wear resistance.

However, polyamide resin has such a problem as to be high in frictional resistance during sliding movement though it is excellent in various material characteristics as discussed above. In this regard, it is known as a measure to lower the frictional resistance of polyamide resin, to add a solid lubricant such as fluororesin (for example, polytetrafluoroethylene) or molybdenum disulfide into polyamide, as disclosed in Japanese Patent Provisional Publication No. 2002-53761. However, with this measure, in case that the surface roughness of an opposite member (in sliding contact with the sliding member) is larger or that a sliding speed of the sliding member is higher, the solid lubricant removes from polyamide resin as a matrix thereby forming a removed section which serves as a starting point of occurrence of pitting wear, or a section in which the solid lubricant low in wear resistance exists partially wears. As a result, the wear of the whole sliding member formed of a thermoplastic resin composition is unavoidably promoted.

In order to suppress the wear of the sliding member formed of the thermoplastic resin composition, it is general to add filler such as glass fiber into the composition. However, it may occur according to sliding conditions that the filler fiber removed from the composition is supplied to the sliding surface so as to serve as an abrasive, thereby promoting the wear of the sliding member.

Furthermore, a method for reforming a fluororesin has been proposed in Japanese Patent Provisional Publication No. 2000-186162, in which crosslinking is made in the fluororesin by irradiating an ionizing radiation onto the fluororesin upon heating the fluororesin at a certain temperature in a low oxygen concentration atmosphere. However, this method is characterized by continuously carrying out the irradiation of the ionizing radiation in place of a conventional manner of intermittently carrying out the irradiation. Additionally, the fluororesin to be treated is sheet-shaped in this method. Therefore, this Publication merely discloses a production method of a reformed fluororesin, and therefore the technique disclosed in this Publication cannot lead to improvements for providing both high wear resistance and low frictional resistance to a sliding member formed of a thermoplastic resin composition.

BRIEF SUMMARY OF THE INVENTION

It is an object of the present invention to provide improved thermoplastic resin composition, resinous material including the resin composition and sliding member using the resinous material which can effectively overcome drawbacks encountered in conventional ones.

Another object of the present invention is to provide an improved thermoplastic resin composition which can provide a resinous material and a sliding member which exhibit both a high wear resistance and a low frictional resistance, i.e., are effectively lowered in frictional resistance without lowering their wear resistance.

A further object of the present invention is to provide an improved thermoplastic resin composition which is formed by adding a fluororesin provided with both crosslink and active end group to a thermoplastic resin as a matrix.

An aspect of the present invention resides in a thermoplastic resin composition which comprises a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end group formed at least a part of the molecule chain of the fluororesin. Additionally, the thermoplastic resin composition further comprises a thermoplastic resin other than the fluororesin, in an amount ranging from 95 to 60 parts by weight.

Another aspect of the present invention resides in a combination of thermoplastic resin composition with a lubricating oil, the thermoplastic resin composition being used in presence of the lubricating oil. The thermoplastic resin composition comprises a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end group formed at least a part of the molecule chain of the fluororesin; and a thermoplastic resin other than the fluororesin, in an amount ranging from 95 to 60 parts by weight. Here, the thermoplastic resin has a surface energy ranging from a first value of [a surface energy of the lubricating oil+0] N/cm to a second value of [the surface energy of the lubricating oil+20×10$^5$] N/cm.

A further aspect of the present invention resides in a resinous material which comprises a thermoplastic resin composition. The thermoplastic resin includes a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end groups formed at least a part of the molecule chain of the fluororesin; and a thermoplastic resin other than the fluororesin, in an amount ranging from 95 to 60 parts by weight. Here, at least a part of the active end groups of the fluororesin is chemically bonded with atom forming part of the thermoplastic resin by kneading both the thermoplastic resin and fluororesin upon heating both the thermoplastic resin and the fluororesin to a temperature close to melting points of the thermoplastic resin and the fluororesin and upon applying a vacuum-suction to both the thermoplastic resin and the fluororesin.

A still further aspect of the present invention resides in a sliding member which comprises a thermoplastic resin composition. The thermoplastic resin composition includes a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end group formed at least a part of the molecule chain of the fluororesin; and a thermoplastic resin other than the fluororesin, in an amount ranging from 95 to 60 parts by weight.

A still further aspect of the present invention resides in a sliding member formed of a resinous material. The resinous material comprises a thermoplastic resin composition which includes a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end groups formed at least a part of the molecule chain of the fluororesin; and a thermoplastic resin other than the fluororesin, in an amount ranging from 95 to 60 parts by weight. Here, at least a part of the active end groups of the fluororesin is chemically bonded with atom forming part of the thermoplastic resin by kneading both the thermoplastic resin and fluororesin upon heating both the thermoplastic resin and the fluororesin to a temperature close to melting points of the thermoplastic resin and the fluororesin and upon applying a vacuum-suction to both the thermoplastic resin and the fluororesin.

A still further aspect of the present invention resides in a chain system for an internal combustion engine. The chain system comprises a shoe of at least one of a chain guide and a chain tensioner, the shoe being formed of a resinous material which includes a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end group formed at least a part of the molecule chain of the fluororesin; and a thermoplastic resin other than the fluororesin, in an amount ranging from 95 to 60 parts by weight. Additionally, a metal chain is provided in sliding contact with the shoe, the metal chain having a surface roughness (Rz) of not larger than 5 μm.

A still further aspect of the present invention resides in a seal ring used in a motor vehicle, formed of a resinous material. The resinous material comprises a thermoplastic resin composition which includes a fluororesin in an amount ranging from 5 to 40 parts by weight, the fluororesin including crosslink formed between at least a part of carbon atoms forming part of a molecule chain of the fluororesin and at least a part of carbon atoms forming part another molecular chain of the fluororesin, and active end group formed at least a part of the molecule chain of the fluororesin; and a thermoplastic resin other than the fluororesin, in an amount ranging from 95 to 60 parts by weight. The thermoplastic resin is at least one selected from the group consisting of polyamideimide resin, polyetherimide resin, and polyetherether ketone resin.

A still further aspect of the present invention resides in a method of producing a resinous material containing a fluororesin and a thermoplastic resin other than the fluororesin. The producing method comprises (a) irradiating an ionizing radiation in a dosage ranging from 1 kGy to 10 MGy onto the fluororesin in a condition in which the fluororesin is heated at a temperature of not lower than a melting point of the fluororesin an inert gas atmosphere having an oxygen concentration of not higher than 1.33 kPa; and (b) introducing the fluororesin irradiated with the ionizing radiation into an extruder to knead both the thermoplastic resin and the fluororesin upon heating both the thermoplastic resin and the fluororesin to a temperature close to melting points of the thermoplastic resin and the fluororesin and upon applying a vacuum-suction to both the thermoplastic resin and the fluororesin.

DETAILED DESCRIPTION OF THE INVENTION

Figure 1:
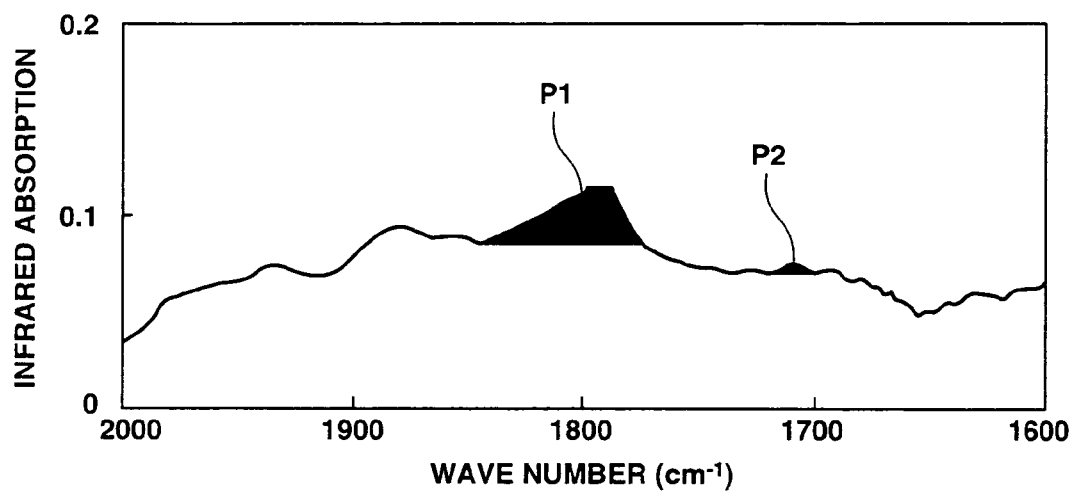
FIG. 1 is a FT-IR chart of a tetrafluoroethylene resin forming part of a thermoplastic resin composition according to the present invention, provided with crosslinks and active end groups by irradiating an ionizing radiation onto a tetrafluoroethylene resin.

According to the present invention, a thermoplastic resin composition comprises a fluororesin in an amount ranging from 5 to 40 parts by weight (mass), ; and a thermoplastic resin other than the fluororesin, in an amount ranging from 95 to 60 parts by weight (mass). The fluororesin includes crosslink formed between at least a part of carbon atoms forming part of a molecule chain of the fluororesin and at least a part of carbon atoms forming part another molecular chain of the fluororesin, and active end group formed at least a part of the molecule chain of the fluororesin.

Examples of the thermoplastic resin other than the fluororesin are polyamide resin, polyester resin, polyacetal resin, polyphenylene sulfide resin, polyether sulfone resin, polyamideimide resin, polyetherimide resin, polyetherether ketone resin, and the like which have a reaction point (functional group). Preferably, the thermoplastic resin has a melting point of not lower than 250° C. in order to obtain a good adhesiveness between it and the fluororesin. In order to improve the adhesiveness between the other thermoplastic resin and the fluororesin, it is preferable that the other thermoplastic resin and the fluororesin are sufficiently blended or mixed with each other during kneading, in which it is required to heat the fluororesin at a temperature of not lower than 250° C. in order to plasticize general fluororesins. Accordingly, if the other thermoplastic resin has a melting point lower than 250° C., the other thermoplastic resin will be unavoidably thermally decomposed.

In the present specification, the above-mentioned term "the other thermoplastic resin" means a thermoplastic resin other than the fluororesin. However, hereinafter a term "the thermoplastic resin" will mean a thermoplastic resin other than the fluororesin including the crosslink formed between at least a part of carbon atoms forming part of a molecule chain of the fluororesin and at least a part of carbon atoms forming part another molecular chain of the fluororesin, and the active end group formed at least a part of the molecule chain of the fluororesin.

Examples of the fluororesin used in the present invention are tetrafluoroethylene polymer, tetrafluoroethylene-perfluoro (alkylvinyl ether) polymer, and tetrafluoroethylene-hexafluoloropropylene polymer, in which the fluororesin contains both the crosslink and the active end group in its molecule chain.

In general, when the fluororesin is added to the thermoplastic resin to form a thermoplastic resin composition, the fluororesin does not have an active reaction point, and therefore only a physical adhesion is made between the thermoplastic resin and the fluororesin, thereby providing a low adhesiveness force therebetween. Accordingly, under a severe sliding condition, the fluororesin will be removed from the thermoplastic resin as a matrix thereby forming a removed trace. The removed trace will serve as a starting point of pitting wear thus to promote the wear of the whole composition. As a result, the composition will be sharply lowered in wear resistance as compared with the single thermoplastic resin. Additionally, when the fluororesin is removed from the thermoplastic resin, the fluororesin will not be able to be retained at the sliding surface, so that a frictional resistance lowering effect cannot be sufficiently obtained.

According to the present invention, the fluororesin itself is provided with the active end group which can readily produce radicals under the action of thermal energy, upon which the active end group of the fluororesin and the reaction point (functional group or the like) of the thermoplastic resin are chemically joined under the action of heat during forming or molding of the thermoplastic resin composition, thereby increasing the adhesiveness between the thermoplastic resin and the fluororesin. In order to sufficiently increase the adhesiveness, it is preferable to heat both the thermoplastic resin and the fluororesin to a temperature close to the melting points of them during kneading using an extruder, and simultaneously to applying a vacuum-suction to the inside of the extruder. Such heating of the thermoplastic resin and the fluororesin to the temperature close to their melting points during the kneading causes the active end group of the fluororesin to make its transformation thereby producing radicals. The end group having the radicals reacts with the reaction point (functional group) of the thermoplastic resin which point has been increased in activity under the action of temperature, so that they are chemically joined with each other. Additionally, the above heating causes both the thermoplastic resin and the fluororesin to be sufficiently plasticized thereby enabling them to be readily mixed. This increases the frequency of joining between the active end group of the fluororesin and the reaction point (functional group) of the thermoplastic resin thereby improving the adhesiveness between them. Here, it is preferable to apply the vacuum-suction to the inside of the extruder in order to suppress an effect-lowering of the radicals produced upon the transformation of the active end group of the fluororesin, the effect-lowering being caused by combining of the radials with oxygen.

It will be understood that by improving the adhesiveness between the thermoplastic resin and the fluororesin, the fluororesin can be prevented from being removed even under the severe sliding condition, and therefore the thermoplastic resin composition obtained from the thermoplastic resin and the fluororesin can exhibit a good wear resistance.

According to the present invention, in addition to the above effect of preventing the removal of the fluororesin, the crosslink is provided to the fluororesin so as to improve the wear resistance of the fluororesin itself while suppressing a partial wear at a section where the fluororesin exists, thus to further improve the wear resistance of a resinous material formed of the thermoplastic resin composition. Thus, according to the present invention, the removal prevention for the fluororesin can be achieved by providing the active end group, and additionally the wear resistance is improved by providing the crosslink. Preferably by accomplishing the provision of the active end group and the crosslink at the same step in a production process, the wear resistance of the resinous material formed of the thermoplastic resin composition including the thermoplastic resin and the fluororesin can be improved even under severe conditions, as compared with that of a resinous material formed of the single thermoplastic resin.

Additionally, by providing the crosslink to the fluororesin, the wear resistance of a fluororesin thin film to be formed at the surface of an opposite member (with which a sliding member formed of the thermoplastic resin composition according to the present invention is in sliding contact) can be improved as compared with a case where an opposite member is in sliding contact with a sliding member formed of a conventional fluororesin. This makes it possible that the sliding member according to the present invention can exhibit a high frictional resistance lowering effect even in a high PV region, as compared with the conventional sliding member.

The fluororesin having the active end group and the crosslink is contained in a range of from 5 to 40% by weight, preferably in a range of from 10 to 30% by weight, in the thermoplastic resin composition. If the content of the fluororesin is leas than 5% by weight, the fluororesin thin film (removed from the sliding member formed of the thermoplastic resin composition according to the present invention) cannot be sufficiently formed at the surface of the opposite member, so that no frictional resistance lowering effect can be recognized. If the content of the fluororesin exceeds 40% by weight, the strength of the resinous material formed of the thermoplastic resin composition sharply lowers.

Providing the active end group and the crosslink to the fluororesin is accomplished by irradiating an ionizing radiation in a dosage range of from 1 kGy to 10 MGy onto the fluororesin in a condition of heating the fluororesin at a temperature of not lower than its melting point in an inert gas atmosphere having an oxygen concentration of not larger than 1.33 kPa. When the irradiation of the ionizing radiation is made onto tetrafluoroethylene under the above conditions, removal of fluorine atom is made so that a molecule chain having radicals appears. The molecule chain having the radials finally forms the crosslink and unsaturated bond between carbon atoms.

Figure 2:
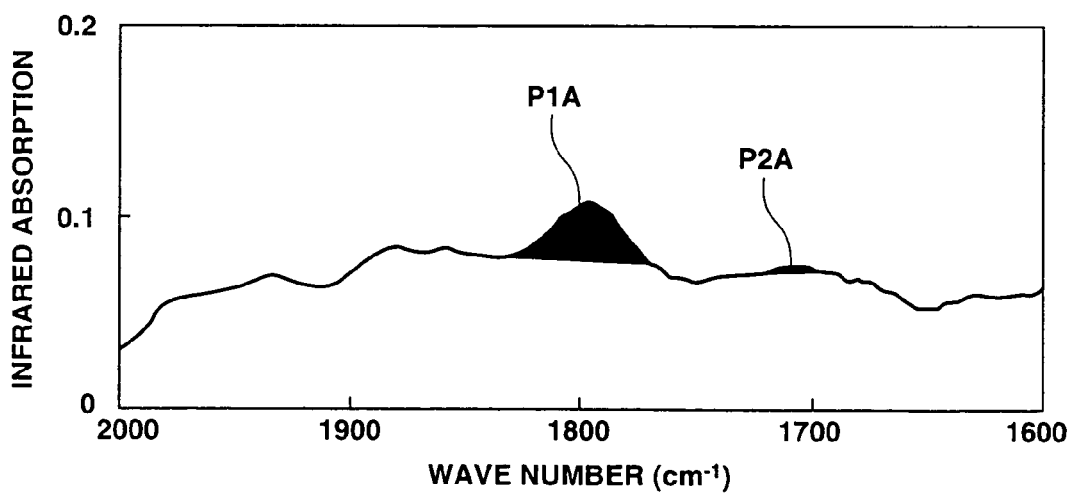
FIG. 2 is a FT-IR chart of a conventional tetrafluoroethylene resin.

As shown in FIG. 1 which is a Fourier Transform-type infrared spectroscopy (FT-IR) of the tetrafluoroethylene resin ("irradiated specimen") which has been provided with the crosslink and the active end group by irradiation of the ionizing radiation, there appears adsorption peaks (indicated as dark peaks P1, P2) due to unsaturated (double) bonds. For reference, FIG. 2 shows a Fourier Transform-type infrared spectroscopy of a general tetrafluoroethylene resin ("not-irradiated specimen") which has not been irradiated with the ionizing radiation), in which there appears adsorption peaks (indicated as dark peaks P1A, P2A) due to unsaturated (double) bonds. As a result of determining the absorption peak areas (the areas of the dark peaks) in FIGS. 1 and 2, it has been confirmed that the adsorption peak areas (corresponding to the unsaturated bonds) of tetrafluoroethylene resin are increased by irradiating the tetrafluoroethylene with the ionization radiation, as shown in Table 1.

TABLE 1

| Wave number (cm − 1) (Attribution peak) | Adsorption peak area of double bond | |
| --- | --- | --- |
| | Irradiated specimen | Not-irradiated specimen |
| 1785 (—CF=CF$_2$) | 1.24 | 1.08 |
| 1717 (—CF=CF—) | 0.065 | 0.052 |

Since the unsaturated bond formed at the end of the fluororesin molecule chain is the active end group, it is chemically bonded with the reaction point (functional group or the like) of the thermoplastic resin under the action of a thermal load during the molding thereby improving the adhesiveness of the thermoplastic resin and the fluororesin.

In the irradiation of the ionizing radiation onto the fluororesin, if the above oxygen concentration exceeds 1.33 kPa, the molecule chain having the radicals produced by the irradiation of the ionizing radiation react with oxygen thereby making it impossible to provide the active end group and the crosslink to the fluororesin. During this irradiation, the fluororesin is heated at the temperature of not lower than its melting point so as to increase the motility of the molecule chain thereby effectively promoting a cross-linking reaction. If the fluororesin is heated at a temperature lower than its melting point or a temperature largely higher than its melting point during the irradiation, decomposition of the molecule chain will be mainly made rather than the cross-linking reaction of the fluororesin, and therefore the heating temperature for the fluororesin is preferably within a range of from a first level of [the melting point of the fluororesin+10]° C. to a second level of [the melting point of the fluororesin+30]° C.

The irradiation of the ionizing radiation is normally made at the dosage range of from 1 kGy to 10 MGy, preferably in a dosage range of from 10 kGy to 1500 kGy. If the dosage is less than 1 kGy, a reaction for removing fluorine cannot sufficiently proceed so as to make it impossible to provide the active end group and the crosslink to the fluororesin. If the dosage exceeds 10 MGy, the decomposition of the molecule chain of the fluororesin is mainly made rather than occurrence of the crosslinking reaction of the fluororesin.

It is preferable that the fluororesin (of the particle-form) having the active end group and the crosslink, to be added to the thermoplastic resin has an average diameter or average equivalent diameter (referred hereinafter to as "average diameter") ranging from 1 to 30 μm. The average diameter is measured as follows: A certain amount of particles (of the fluororesin) whose average diameter is to be measured is sampled in a container. Then, irradiation of laser beam is made onto the sampled particles, upon which a diffraction point and scattered beams are measured. Based on the diffraction point and the scattered beams, a particle distribution for the sampled particles is determined by using a measuring device such as a "Microtrack 9320HRA" produced by Nikkisou Co., Ltd.

If the average diameter of the fluororesin is smaller than 5 μm, dispersibility of the fluororesin is degraded so as to make it difficult to uniformly disperse the fluororesin in the thermoplastic resin. If the average diameter exceeds 30 μm, the adhesiveness of the fluororesin to the thermoplastic resin is lowered so that the fluororesin tends to readily remove from the thermoplastic resin. Here, shapes of the particles of the fluororesin are particularly limited to particular ones as far as the particles are obtained using pulverizers such as a jet mill. Examples of the shapes of the particles of the fluororesin are spherical, elliptic in cross-section, cylindrical or column-like, and irregular. It will be understood that the average equivalent diameter is used in place of the average diameter in case that the shape of the particles of the fluororesin is irregular.

As discussed above, the fluororesin provided with the crosslink and the active end group is obtained by irradiating the ionizing radiation in the dosage range of from 1 kGy to 10 MGy onto the fluororesin in the condition of heating the fluororesin at the temperature of not lower than its melting point in the inert gas atmosphere having an oxygen concentration of not larger than 1.33 kPa. When the above irradiation of the ionizing radiation is made on the fluororesin having the average diameter ranging from 5 to 30 μm, the above effects of the present invention can be exhibited at the maximum level.

In case that the resinous material formed of the thermoplastic resin composition of the present invention used in the presence of a lubricating oil, it is preferable to select as the thermoplastic resin of the present invention, a thermoplastic resin having a surface energy ranging from a first value of [the surface energy of the lubricating oil+0] N/cm to a second value of [the surface energy of the lubricating oil+20×10$^5$] N/cm, preferably from a third value of [the surface energy of the lubricating oil+5×10$^5$] N/cm to a fourth value of [the surface energy of the lubricating oil+20×10$^5$] N/cm. This thermoplastic resin exhibits a good wettability for lubricating oil, thereby extending a fluid lubrication region during sliding. Additionally, this thermoplastic resin is improved in an oil film maintainability, thereby further lowering the frictional resistance. The above extension of the fluid lubrication region makes it possible to lower the frictional resistance even under a severe sliding condition. In general, the surface energy of the thermoplastic resin and the friction coefficient are in correlation to each other so that the friction coefficient increases as the surface energy becomes larger. Therefore, in order to cause a friction coefficient lowering effect to be exhibited the maximum, it is preferable to select the thermoplastic resin having the surface energy within the above range.

In case of applying the thermoplastic resin composition of the present invention to a sliding part or member of an internal combustion engine such as a chain guide shoe or the like, it is preferable to select polyamide resin as the thermoplastic resin and to select polytetrafluoroethylene as the fluororesin. Polyamide is high in heat resistance, oil resistance, mechanical strength and low in cost while having a surface energy within a range of from a value of [the surface energy of an engine oil+0] N/cm to a second value of [the surface energy of the engine oil+20×10$^5$] N/cm, and therefore it is excellent in wettability to engine oil thereby making it possible to lower the friction coefficient under a fluid lubrication. Tetrafluoroethylene has the minimum friction coefficient among various fluororesins, and therefore it is made possible to lower the friction coefficient the maximum in a boundary lubrication region. Thus, by combining the above two materials, it is made possible to lower the friction coefficient throughout a wide range of from the fluid lubrication region to the boundary lubrication region.

It is more preferable to select polyamide 66 resin as the thermoplastic resin from the viewpoints of high heat resistance, oil resistance, mechanical strength and low cost, and to select tetrafluoroethylene resin as the fluororesin from the viewpoint of low friction coefficient. The thermoplastic resin composition including polyamide 66 and tetrafluoroethylene resin is suitable for the material of a shoe of a chain guide or of a chain tensioner for an internal combustion engine. In order to cause the frictional resistance lowering effect to be exhibited the maximum, it is preferable that a metal chain serving as the opposite member (in sliding contact with the shoe) has a maximum surface roughness Rz (corresponding to a "the maximum height" roughness according to JIS B0601-2001) of not larger than 5 μm. If the maximum surface roughness Rz exceeds 5 μm, the unevenness at the surface of the metal chain prevents the fluororesin from adhering to the metal chain surface, so that a remarkable frictional resistance lowering effect cannot be obtained.

In case that the thermoplastic resin composition of the present invention is used as the material of a seal ring for a motor or automotive vehicle, the thermoplastic resin is preferably polyamideimide resin, polyetherimide resin or polyetherether ketone resin. Such thermoplastic resins are high in heat resistance, oil resistance and mechanical strength and low in cost.

The resinous material of the present invention is produced by kneading the fluororesin and the thermoplastic resin while being heated to a temperature close to the melting points of the fluororesin and the thermoplastic resin and while being subjected to the vacuum-suction, so that at least a part of the active end groups of the fluororesin is chemically bonded with atom forming part of the molecule chain of the thermoplastic resin. In the resinous material containing the fluororesin, the adhesiveness between the fluororesin and the thermoplastic resin is increased, so that the resinous material can exhibit the frictional resistance lowering effect throughout a long period of time when used as a sliding member.

The resinous material of the present invention suitable for a resinous sliding member is produced as follows:

First, the ionizing radiation is irradiated in the dosage range of from 1 kGy to 10 MGy onto the fluororesin in a condition to heat the fluororesin at a temperature of not lower than its melting point in an inert gas atmosphere having an oxygen concentration of not larger than 1.33 kPa. Thereafter, a mixture of the thus irradiated fluororesin and the thermoplastic resin are introduced into an extruder and kneaded in the extruder while being heated to a temperature close to the melting points of the fluororesin and the thermoplastic resin and while being subjected to the vacuum-suction in the extruder. It will be understood that the above mixture of the irradiated fluororesin and the thermoplastic resin corresponds to an embodiment of the thermoplastic resin composition of the present invention. As the extruder, a non-screw extruder or a screw extruder generally used in plastic molding can be used as far as a heating device and the vacuum-suction is applicable to the extruder. Here, heating the mixture to the temperature close to the melting points of the fluororesin and the thermoplastic resin is accomplished, in practice, by heating the mixture to a temperature higher than the melting points of both the fluororesin and the thermoplastic resin. This temperature is preferably within a range of from a level higher 10° C. than the higher one of the melting points of the both the fluororesin and the thermoplastic resin to a level higher 30° C. than the higher one of the melting points. The thus produced resinous material including the fluororesin can exhibit the frictional resistance lowering effect throughout a long period of time when it is used as the material of a sliding member.

EXAMPLES

The present invention will be more readily understood with reference to the following Examples in comparison with Comparative Examples; however, these Examples are intended to illustrate the invention and are not to be construed to limit the scope of the invention.

Example 1

As a raw material of the fluororesin to be provided with crosslink and active end group, tetrafluoroethylene was selected because it was excellent in low frictional resistance property among various fluororesins. A molding powder (having the trade name "G-163" of Asahi Glass Co., Ltd. and having an average diameter of about 40 μm) of tetrafluoroethylene was subjected to irradiation of electron beam (at an accelerating voltage of 2 MeV) at a dosage of 100 kGy in a heating condition of 350° C. in an atmosphere having an oxygen concentration of 133 Pa and a nitrogen concentration of 105.4 kPa, so that the crosslink and the active end group were provided to or formed in the molding powder of tetrafluoroethylene. Thereafter, pulverization by a jet mill was made on the molding powder which had been irradiated with the electron beam, until the average diameter of the molding powder of the fluororesin reached a level of about 20 μm. Thus, the molding powder (fluororesin) having the crosslink and the active end group was prepared.

Figure 3:
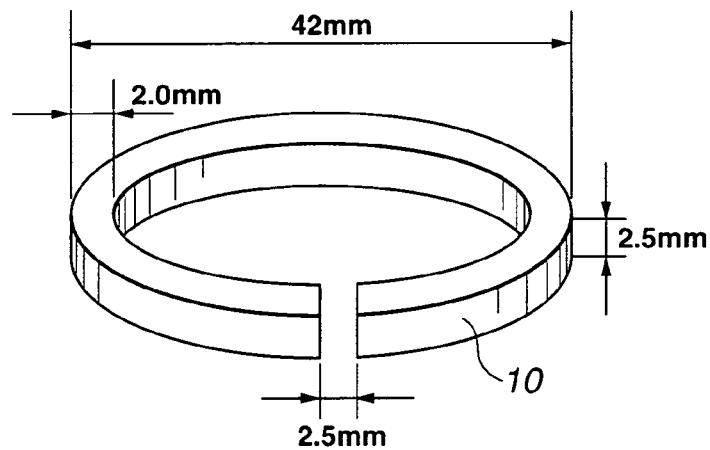
FIG. 3 is a perspective view of a ring-shaped test piece on which a friction test is conducted, the ring-shaped test piece also corresponding to a sliding member according to the present invention.

Subsequently, 20 parts by weight (mass) of the above molding powder of the fluororesin was blended to 80 parts by weight (mass) of polyamide 66 resin (having the trade name "Zytel 45HSB" of Dupont Co., Ltd.) to form a mixture. The mixture was introduced into an extruder, and molten and kneaded in the extruder to which a vacuum-suction was applied, followed by being palletized to form pellets of a resinous material. The pellets were molded to a ring-shaped test piece as shown in FIG. 3 by using an injection machine. The ring-shaped test piece had a diameter of 42 mm, a width of 2.0 mm and a thickness of 2.5 mm, and was formed with a slit having a width of 2.5 mm.

Example 2

A procedure for preparing the molding powder (fluororesin) having the crosslink and the active end group in Example 1 was repeated. Subsequently, 20 parts by weight of the above molding powder (fluororesin) was blended to 80 parts by weight (mass) of polyamideimide resin (having the trade name "Torlon 4203L" of Solvay Advanced Polymers) to form a mixture. The mixture was introduced into an extruder, and molten and kneaded in the extruder to which a vacuum-suction was applied, followed by being palletized to form pellets of a resinous material. The pellets were molded into a ring-shaped test piece as shown in FIG. 3 by using an injection machine. Thereafter, the molded ring-shaped test piece was subjected to a post-cure under a heat cycle including a first heating step of at 170° C. for 24 hours, a second heating step of at 220° C. for 24 hours and a third heating step of at 240° C. for 24 hours.

Comparative Example 1

Pellets of polyamide 66 resin (having the trade name "Zytel 45HSB" of Dupont Co., Ltd.) as same as that in Example 1 were dried and thereafter was molded into a ring-shaped test piece as shown in FIG. 3 by using an injection machine.

Comparative Example 2

A molding powder (having the trade mane "G-163" of Asahi Glass Co., Ltd. and an average diameter of about 40

μm) of tetrafluoroethylene as same as that in Example 1 was blended in an amount of 20 parts by weight to 80 parts by weight of polyamide 66 resin (having the trade name "Zytel 45HSB" of Dupont Co., Ltd.) as same as that in Example 1 thereby forming a mixture. Subsequently, the mixture was introduced into an extruder and kneaded in the extruder to which a vacuum-suction was applied, followed by being palletized to form pellets of a resinous material. The pellets were molded to a ring-shaped test piece as shown in FIG. 3 by using an injection machine.

Comparative Example 3

A molding powder (having the trade mane "G-163" of Asahi Glass Co., Ltd. and having an average diameter of about 40 μm) of tetrafluoroethylene as same as that in Example 1 was blended in an amount of 20 parts by weight to 60 parts by weight of polyamide 66 resin (having the trade name "Zytel 45HSB" of Dupont Co., Ltd.) as same as that in Example 1 thereby forming a mixture. Subsequently, the mixture was introduced into a biaxial extruder and kneaded in the extruder while supplying the extruder with 20 parts by weight of glass fiber (having the trade name of "MF-KAC" of Asahi Fiber Glass Co., Ltd.) through a side feeder, followed by being palletized. The pellets were molded to a ring-shaped test piece as shown in FIG. 3 by using an injection machine.

Friction Test

In order to evaluate the sliding characteristics of sliding members formed of the thermoplastic resin compositions according to the present invention, a friction test was conducted in an engine oil ("SJ Strong Save X M-Special 5W-30" Nissan Motor Company Ltd. genuine oil) on each ring-shaped test piece (sliding member) 10 of Examples 1 and 2 according to the present invention, and each ring-shaped test piece (sliding member) of Comparative Examples 1 to 3 which were outside the scope of the present invention. In the friction test, each sliding member was in sliding contact with opposite member (steel disc) 14 formed of a general carbon steel ("S55C" heat-treated material having a Rockwell hardness (A-scale) of 70). The "S55C" is according to JIS G 4051, and the Rockwell hardness (A-scale) is according to JIS Z 2245. Opposite member 14 be installed to a friction tester was disc-shaped and had a diameter of 60 mm and thickness of 10 mm, and has a surface roughness (Rz) of about 5 μm.

Figure 4:
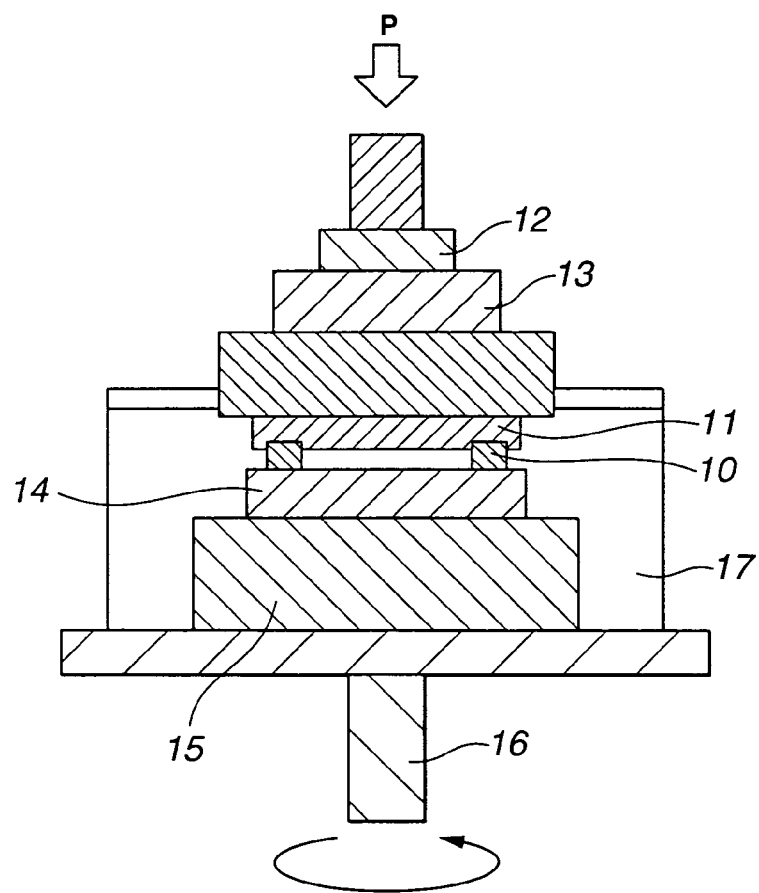
FIG. 4 is a schematic vertical sectional view of a pin-on-disc type friction tester used for the friction test of the ring-shaped test piece.

The friction tester used in the friction test is shown in FIG. 4. The friction tester was a vertical ring-on-disc type, and was provided at its upper section with ring holder 11. Ring holder 11 was formed with a fixing groove for preventing a diametrical movement of ring-shaped test piece 10 during sliding movement of the test piece, and provided with a pin for preventing a rotational movement of ring-shaped test piece 10 during sliding movement of the test piece, the pin being located at the fixing groove. The friction tester was further provided at its lower section with disc holder 15 which is connected to rotating shaft 16. Steel disc (opposite member) 14 was fixed on disc holder 15 with bolts, so that disc 14 was rotatable with ring-shaped test piece 10. The friction tester also includes a load cell 12 ad a torque detection device 13. With the above arranged friction tester, a pressure P was applied in an axial direction of ring holder 11, and therefore ring-shaped test piece 10 was brought into sliding contact with steel disc 14. Then, the pressure P was further applied in the axial direction of ring holder 11 so that ring-shaped test piece 10 was brought into press contact with steel disc 14. At this time, a press-contacting section of ring-shaped test piece 10 and steel disc 14 had been dipped in an engine oil 17 ("SJ Strong Save X M-Special 5W-30" Nissan Motor Company Ltd. genuine oil). This friction test was conducted in the above manner by rotating the rotating shaft 16 under the following conditions: a bearing pressure between test piece 10 and steel disc 14 was 2 MPa; a sliding speed of test piece 10 was 7 m/s; and a test time (for which rotating shaft 16 was rotated) was 6 hours. During this friction test, a friction coefficient for each test piece of Examples 1 and 2 and Comparative Examples 1, 2 and 3 was measured. Results of the measurement of the friction coefficient are shown in FIG. 5.

Figure 5:
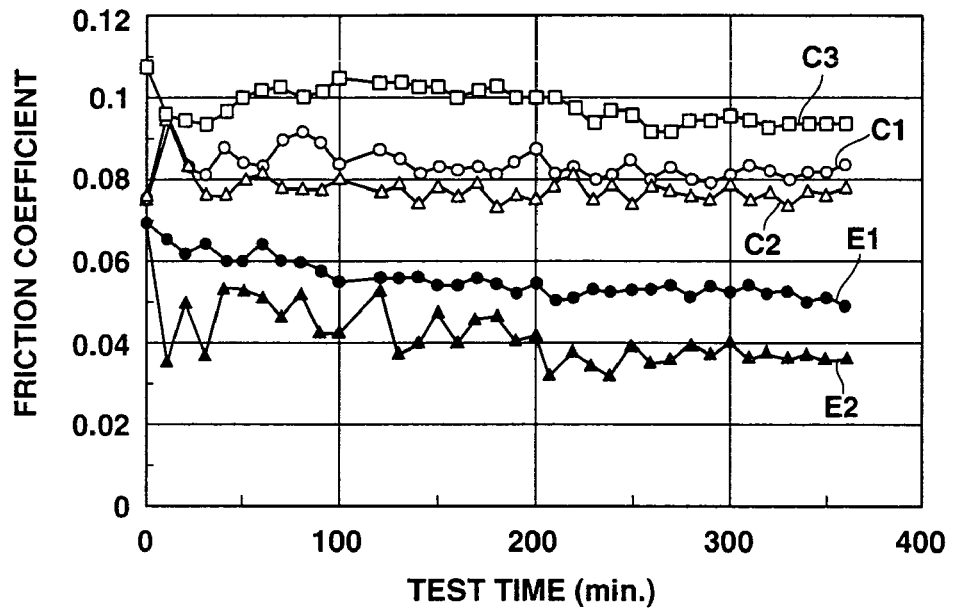
FIG. 5 is a graph showing the relationship between the friction coefficient and the test time (minutes), illustrating a change of the friction coefficient with lapse of time during the friction test.

In FIG. 5 which is a graph showing a change in friction coefficient with lapse of time, lines E1, E2 respectively represent friction coefficients of the test pieces of Examples 1 and 2, and lines C1, C2 and C3 respectively represent frictional coefficients of Comparative Examples 1, 2 and 3. FIG. 5 depicts that the test pieces of Examples 1 and 2 are considerably low in absolute value of friction coefficient as compared with those of Examples 1 to 3. In the test pieces of Examples 1 and 2, the fluororesin is prevented from removing from the thermoplastic resin as a matrix by providing the active end group to the fluororesin, so that the fluororesin tends to readily stay at the sliding surface between the test piece and the opposite member (or steel disc 14). As a result, the frictional resistance lowering effect of the fluororesin can be exhibited the maximum, thereby lowering the frictional resistance at a sliding contact section between the test piece and the opposite member. Additionally, in the test pieces of Examples 1 and 2, by providing the crosslink to the fluororesin, the wear resistance of the fluororesin film formed at steel disc 14 (due to removal of the fluororesin from the test piece to the steel disc) can be improved, thereby making it possible to exhibit the frictional resistance lowering effect throughout a long period of time.

In comparison of the test pieces of Examples 1 and 2, both polyamideimide resin in Example 2 and polyamide 66 resin in Example 1 have a surface energy higher than that (not lower than 17) of the engine oil ("SJ Strong Save X M-Special 5W-30" Nissan Motor Company Ltd. genuine oil), as shown in Table 2, so that they exhibit a good wettability to engine oil 17. However, polyamideimide resin itself is lower in surface energy of itself than polyamide 66, and therefore the test piece of Example 2 is lowered in frictional resistance in the friction test as compared with that of Example 1.

TABLE 2

| Material | Surface energy ($10^5$ N/cm) |
| --- | --- |
| Polytetrafluoroethylene (PTFE) | 19.3 |
| Polyetherether ketone (PEEK) | 45.3 |
| Polyamide (PA 66) | 46.4 |
| Polyamideimide (PAI) | 31.8 |
| Nissan Motor Company, Ltd. genuine engine oil (SJ Strong Save X M-Special 5W-30"). | 26.8 |

Concerning the test piece of Comparative Example 2, although it is filled with the fluororesin, the fluororesin unavoidably removes from polyamide 66 resin as the matrix and therefore cannot effectively stay at the sliding surface between the test piece and the opposite member. As a result, the friction coefficient of the test piece of Comparative Example 2 is only slightly lower than that of the test piece of Comparative Example 1 formed of only polyamide 66 resin. Concerning the test piece of Comparative Example 3, since the glass fiber is filled into polyamide 66 resin as the matrix, the glass fiber is removed from the polyamide 66 resin and supplied into the sliding surface between the test piece and the opposite member, so that its friction coefficient is higher than that of the test piece of Example 1, exhibiting no effect of the fluororesin added to the test piece of Comparative Example 3.

Figure 6:
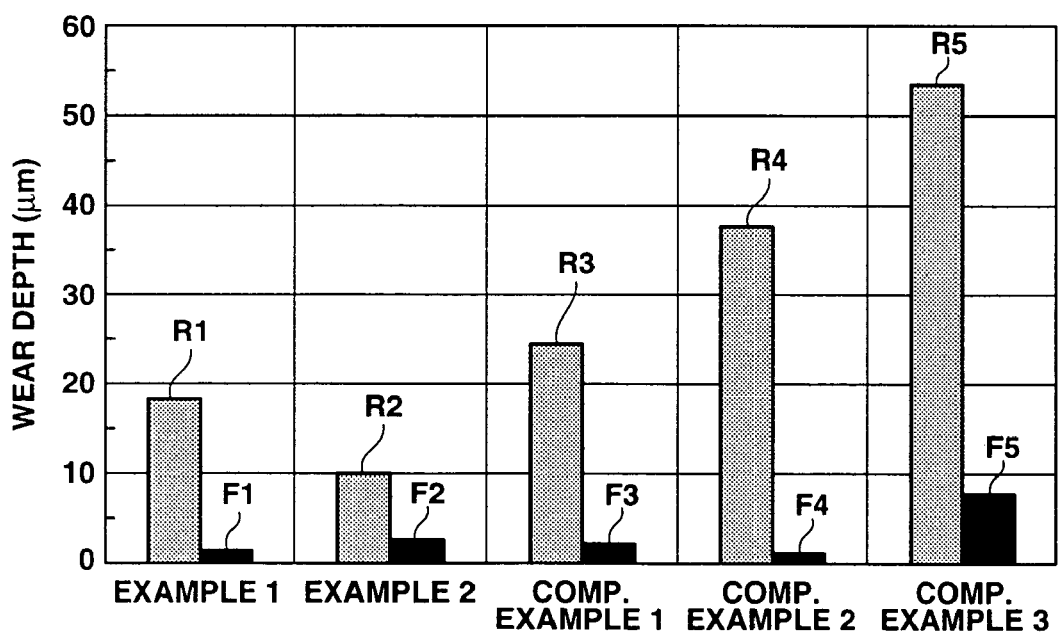
FIG. 6 is a graph showing abrasion heights of the ring-shaped test piece and a steel disc in each of Examples 1 and 2 and Comparative Examples 1, 2 and 3, measured after the friction test.

Next, a wear depth of ring-shaped test piece 10 and steel disc (opposite member) 14 in each of Examples 1 and 2 and Comparative Examples 1 to 3 was measured after the ring-shaped test piece 10 had been subjected to the above friction test using the friction tester in FIG. 4. Results of this measurement are shown in FIG. 6 in which R1, R2, R3, R4, R5 respectively indicate the wear depths of test pieces 10 in Examples 1 and 2, and Comparative Examples 1, 2 and 3; and F1, F2, F3, F4 and F5 respectively indicate the wear depths of steel discs 14 of Examples 1 and 2, and Comparative Examples 1, 2 and 3. The wear depth means a height reduced by wear in the friction test, in a roughness curve according to JIS B0601-2001.

As depicted in FIG. 6, the test pieces of Examples 1 and 2 exhibit good sliding characteristics to the iron disc 14 and therefore are low in wear depth as compared with the test pieces of Comparative Examples 1, 2 and 3. In comparison of Examples 1 and 2, polyamideimide resin in Example 2 is excellent in heat resistance and low in friction coefficient as discussed above so as to be low in calorific value in the sliding section, as compared with polyamide 66 resin in Example 1. As a result, the abrasion amount of test pieces 10 of Examples 1 and 2 is reduced as compared with that of the test pieces of Comparative Examples 1, 2 and 3.

Concerning Comparative Examples 2 and 3, the wear depth of test pieces 10 after the friction test were large as compared with that of test piece 10 in Comparative Example 1, so that the test pieces in Examples 2 and 3 are degraded in wear resistance as compared with the test piece in Comparative Example 1. In the test piece in Comparative Example 2, pitting occurs from a fluororesin removal section (from which fluororesin is removed) serving as a starting point, thereby accelerating the wear of test piece 10. To the contrary, in Comparative Example 3, glass fiber removed from the sliding surface of test piece 10 stays at the sliding surface and serves as abrasive, thereby promoting the wear of test piece 10 and steel disc 14. In addition, in Comparative Example 3, an edge portion of the glass fiber projected from the sliding surface of test piece 10 also serves to promote the wear of steel disc 14.

As appreciated from the above friction test results, the frictional resistance between the sliding member (ring-shaped test piece 10) and the opposite member (steel disc 14) can be largely lowered while improving the wear resistance of the sliding member itself by forming the sliding member of the resinous material which is prepared by adding 5 to 40 parts by weight of the fluororesin provided with the crosslink and the active end group to the thermoplastic resin. Thus, according to the present invention, the sliding member can be lowered in frictional resistance without lowering its wear resistance. Additionally, the sliding characteristics of the sliding member can be largely improved merely by adding the fluororesin provided with the crosslink and the active end group to the thermoplastic resin, thereby making it possible to reduce an investment for obtaining a sliding characteristics improvement. Here, the fluororesin provided with the crosslink and the active end group is prepared by irradiating the ionizing radiation in a dosage ranging from 1 kGy to 10 MGy onto the fluororesin in a condition in which the fluororesin is heated at a temperature of not lower than the melting point of the fluororesin in an inert gas atmosphere having an oxygen concentration of not higher than 1.33 kPa. Additionally, in case that the sliding member is used in the presence of lubricating oil, an oil film maintainability can be improved while further lowering the frictional resistance by selecting as the matrix the thermoplastic resin having a surface energy ranging from a first value of [the surface energy of the lubricating oil+0] N/cm to a second value of [the surface energy of the lubricating oil+20×10$^5$] N/cm.

The entire contents of Japanese Patent Application P2002-303000 (filed Oct. 17,2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A combination of a thermoplastic resin composition with a lubricating oil comprising:
   (a) a lubricating oil in contact with
   (b) a thermoplastic resin composition,
   wherein the thermoplastic resin composition comprises:
   a fluororesin in an amount ranging from 5 to 40 parts by weight, the fluororesin including a crosslink formed between at least a part of a molecule chain of the fluororesin and at least a part of another molecular chain of the fluororesin, and active end groups that form at least a part of the molecule chain of the fluororesin; and
   a thermoplastic resin other than a fluororesin, in an amount ranging from 95 to 60 parts by weight,
   wherein at least a part of the active end groups of the fluororesin is chemically bonded with a part of the thermoplastic resin; and
   wherein the thermoplastic resin has a surface energy ranging from a first value of [a surface energy of the lubricanting oil+0] N/cm to a second value of [the surface energy of the lubricanting oil+20×10$^5$] N/cm.

2. The combination as claimed in claim 1 wherein the thermoplastic resin composition forms a resinous material whose surface is in contact with the lubricating oil such that the resinous material is lubricated with the lubricating oil.

3. A resinous material consisting essentially of
   20 parts per weight of a fluororesin, the fluororesin including a crosslink formed between at least a part of a molecule chain of the fluororesin and at least a part of another molecular chain of the fluororesin, and active end groups that form at least a part of the molecule chain of the fluororesin, and
   80 parts per weight of polyamide 66 resin,
   wherein at least a part of the active end groups of the fluororesin is chemically bonded with a part of the thermoplastic resin by kneading both the polyamide 66 resin and the fluororesin upon heating both the polyamide 66 resin and the fluororesin to a temperature close to melting points of the polyamide 66 resin and the fluororesin and upon applying a vacuum-suction to both the polyamide 66 resin and the fluororesin.

4. The combination as claimed in claim 2, wherein the thermoplastic resin composition forms a resinous material which substantially contains no lubricating oil therein and has a surface in contact with the lubricating oil such that only the surface of the resinous material is lubricated with the lubricating oil.

5. The combination as claimed in claim 1 prepared by a process comprising the steps of:
   kneading the fluororesin and the thermoplastic resin using an extruder to form the thermoplastic resin composition;

heating the fluororesin and the thermoplastic resin during kneading to a temperature close to the melting points of the fluororesin and the thermoplastic resin; and applying a vacuum-suction to the extruder during kneading.

6. The combination as claimed in claim 1, wherein the fluororesin is chemically bonded to the thermoplastic resin.

7. The combination as claimed in claim 1, wherein the combination exhibits a wear depth of approximately less than 20 μm when sliding at a speed of 7 m/s in contact with a steel disc for 6 hours.

8. The combination as claimed in claim 1, wherein the combination exhibits a friction coefficient of less than 0.06 when sliding at a speed of 7 m/s in contact with a steel disc for 6 hours.

9. A seal ring used in a motor vehicle formed of a resinous material comprising:

a thermoplastic resin composition including a fluororesin in an amount ranging from 5 to 40 parts by weight, the fluororesin including a crosslink formed between at least a part of a molecule chain of the fluororesin and at least a part of another molecular chain of the fluororesin, and active end groups that form at least a part of the molecule chain of the fluororesin, and a thermoplastic resin other than a fluororesin, in an amount ranging from 95 to 60 parts by weight;

wherein at least a part of an active end group of the fluororesin is chemically bonded with a part of the thermoplastic resin by kneading both the thermoplastic resin and fluororesin upon heating both the thermoplastic resin and the fluororesin to a temperature close to melting points of the thermoplastic resin and the fluororesin and upon applying a vacuum-suction to both the thermoplastic resin and the fluororesin.

\* \* \* \* \*